UNITED STATES PATENT OFFICE.

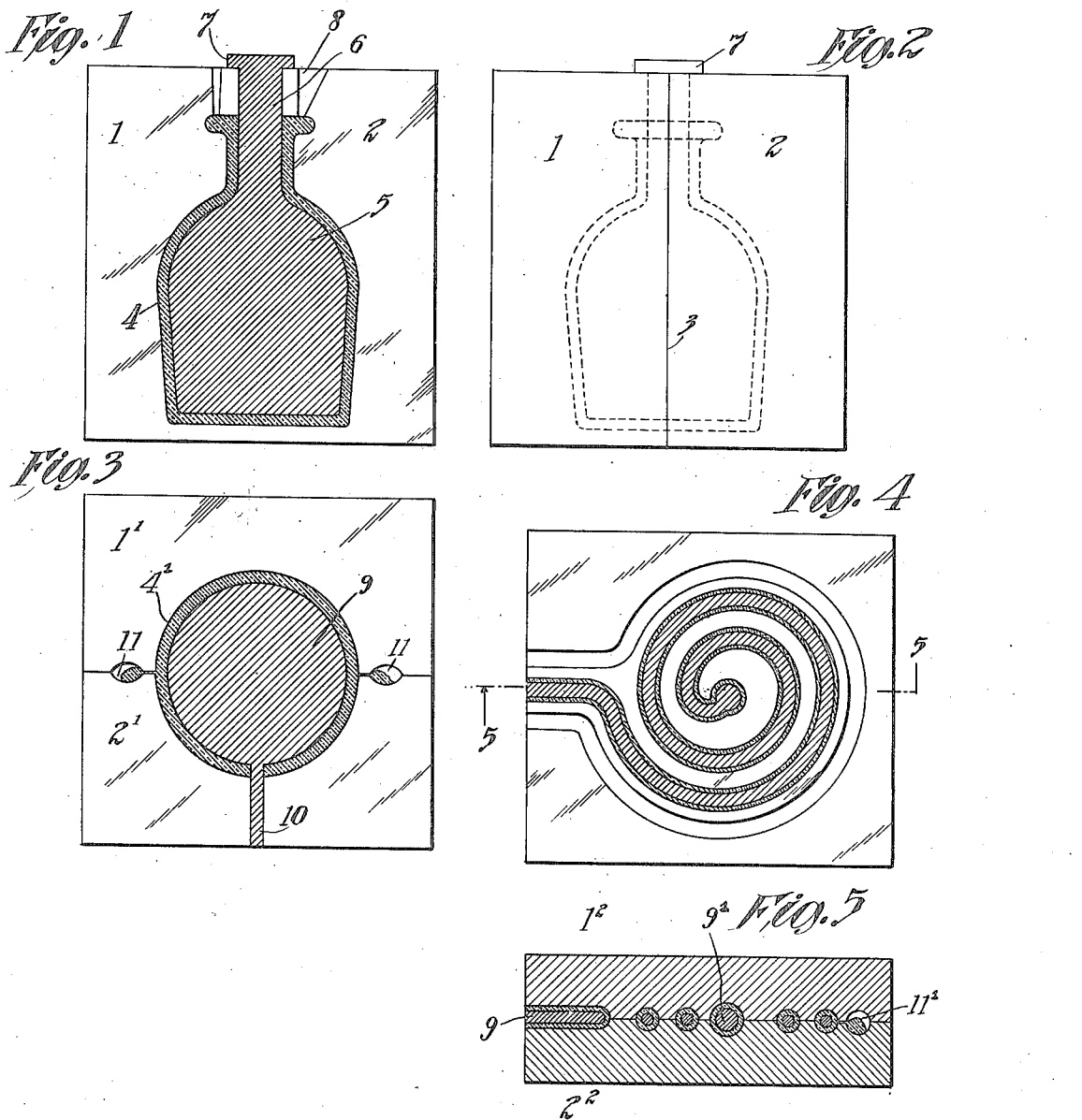

JONAS WALTER AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

METHOD OF MOLDING HOLLOW OBJECTS OF REFRACTORY CONDENSATION PRODUCTS.

1,135,962.          Specification of Letters Patent.      Patented Apr. 13, 1915.

Application filed March 10, 1911. Serial No. 613,576.

*To all whom it may concern:*

Be it known that I, JONAS W. AYLSWORTH, a citizen of the United States, and a resident of East Orange, in the county of Essex and State of New Jersey, have invented a certain new and useful Method of Molding Hollow Objects of Refractory Condensation Products, of which the following is a description.

My invention relates to a method of molding hollow objects of materials which are of such a nature that they cannot readily be formed by known methods into hollow objects, such as balls, spheres, bottles and the like.

Among other objects which can be formed by my invention may be noted handles for toilet articles, novelties, dolls, toys, and other objects having ducts and passages therein of irregular shape.

The class of materials which my improved method is intended to mold are those which become solidified and rendered infusible by reaction of the ingredients during or subsequent to the operation of shaping the same in a mold. Among such materials may be mentioned partial reaction products of phenol and formaldehyde and their equivalents, and mixtures of substances which upon being sufficiently heated, react to form infusible products. An example of this class is a mixture of a fusible phenol-formaldehyde condensation product and a sufficient quantity of formaldehyde, hexa-methylene-tetra-amin, or other ingredient containing the methylene radical $CH_2$, to react with the fusible product to form a hard infusible product.

My invention is applicable to such substances and others which cannot readily be formed into hollow articles by blowing.

The object of my invention, accordingly, is to provide an efficient process for forming such articles of compositions of the character referred to in an economical manner.

The method comprises the formation of a core of an alloy or other substance which has a melting point higher than the reaction temperature at which the composition hardens, the melting point of the core also being below the temperature at which the composition might be deformed or lose its shape, or be otherwise injured. The object to be formed is shaped around the core, as in a suitable mold, and is hardened by the application of sufficient heat to cause the desired reaction to ensue. The temperature is then raised sufficiently to melt the core which is caused to run out of a suitable aperture or apertures provided for that purpose. The finished hollow object may then be removed from the mold.

In order that a clearer understanding of my invention may be had, attention is hereby directed to the accompanying drawing, forming part of this specification and illustrating the application of my invention to the formation of some of the various forms of hollow objects which can be formed thereby.

In the drawings—Figure 1 represents the formation of a bottle in a suitable mold, the bottle and the core being formed being shown in vertical cross section. Fig. 2 represents a side elevation of the two-part mold used in Fig. 1, the position of the bottle and the core being shown in dotted lines. Fig. 3 represents partly in side elevation and partly in cross section a mold used for the production of a hollow sphere, with the sphere and core shown in cross section. Fig. 4 is a plan and horizontal section showing the formation of a continuous hollow spiral; and Fig. 5 is a section taken on the line 5—5 of Fig. 4.

The core which is to be used is usually cast, turned, or otherwise shaped into the form which should be made hollow in the finished object, and is supported in the proper position in the mold in which the composition is to be poured or pressed.

Referring to Figs. 1 and 2 illustrating one method of forming bottles, a mold comprising the two parts 1 and 2 is used, these molds meeting on the plane surfaces 3 and being adapted to be clamped or otherwise secured together. In Fig. 1 the bottle 4 is shown as formed around the core 5 having an elongated neck 6, on the end of which is a circular flange 7 adapted to rest on the upper surfaces of the mold sections 1 and 2 to support the core in position. In operation the core 5 is formed and the mold sections secured in position surrounding the same with the core suspended by flange 7, as stated, the molds being formed with a space surrounding the core of proper shape and size to receive the material of which the finished bottle is to be formed. The molds are provided with a filling opening 8 through which the desired composition in fluid form may be poured until the space is filled by the fluid material, as indicated by the reference character 4 in the drawings. The molds and composition are then heated to a sufficient temperature and for a sufficient length of time to cause the desired reaction to ensue and the object to be transformed into a hard infusible object, with or without the application of pressure, as by causing the reaction to take place in a suitable autoclave in which the molds may be placed, according to the character of the reacting ingredients and the requirements for the object being formed. The temperature is then raised sufficiently to melt the core 5, which temperature, however, is not sufficiently high to deform or injure bottle 4. The mold may then be inverted and the melted core caused to flow out, after which the molds may be separated and the finished bottle removed. Or the core might be melted and removed after the removal of the finished bottle from the mold.

It is also obvious that if desired the bottle might have been formed not by a pouring process but by a pressing process, in which case the material of which the object was to be formed might be placed in position around the core in plastic condition in sheets of a thickness greater than the space to be occupied by the finished article, so that the pressure of the mold sections in being brought together during the hardening reaction would form the object and exert pressure upon the same. In this case a suitable "flash" would have to be provided to take care of the surplus material squeezed out during the pressing.

In Fig. 3 I have illustrated the formation of a hollow sphere by a pressing operation. The spherical core 9 in this case has a small cylindrical runner 10 formed integral therewith and of the same material. The material of which the sphere 4' is to be formed is placed within the upper and lower mold sections 1' and 2' in sheets of roughly semi-spherical form in plastic condition, and the mold sections brought together with the core 9 between the halves of the sphere to be formed. The core is supported by the plastic material in the lower mold section with the runner or extension 10 of the core extending through the lower part of the plastic material and preferably extending through an opening provided for the same in mold section 2' to the surface thereof. The flash spaces 11, 11 are provided between the mold sections for the reception of the surplus material. The mold sections are then brought together in a suitable press while heat is applied sufficiently to cause the hardening reaction as the mold sections are brought together, the sphere being thus properly formed and the upper and lower portions of the same welded together autogenously before the material has finally hardened, surplus material being squeezed out into the openings 11, 11. Heat sufficient to melt the alloy of which the core is composed is then applied, and the core and runner 10 melting, flow out through the opening in the sphere and the mold left by the melting of the runner. The mold sections may then be removed and the small hole left by the melting of runner 10 may be plugged up with any suitable material. A similar method may be used in the case of any hollow object having a continuous closed surface.

Figs. 4 and 5 illustrate the formation of a continuous spiral. The material of which the lower half of the spiral is to be formed is placed in position in the lower mold $2^2$ with the core 9' placed on the same as shown, and the upper mold $1^2$ carrying the upper portion of the material of which the spiral is to be formed is then pressed into contact with the same with the application of heat to form the object in the manner described in connection with Fig. 3. Upon application of further heat the melted core will run out of the open end of the spiral. A suitable flash 11' may be provided and connected with the spiral as shown.

Suitable solid solvent elements or other ingredients desired to give any required quality to the finished article may be incorporated with the mixture before the final reaction. It is often desirable to add solid solvent elements to the mass, by which term I mean substances which combine with the mass at the reaction temperature, remain therein in a condition of solid solution, and render the mass somewhat plastic when reheated, induce a higher reaction between the reacting ingredients in some cases, and decrease the stresses and strains within the molded article. Among such substances may be mentioned naphthalene and some of its derivatives, such as the chloro and nitro derivatives, chlorinated or other halogenized phenols, especially the higher chloro phenols, di-nitro-benzene, and many others.

Suitable alloys to be used for the formation of cores, as described, are alloys of tin and lead, and of tin, lead and bismuth, and also of tin, lead and cadmium. An alloy of three parts tin and two parts lead melts at 320 degrees F., and is well adapted for cores to be used in conjunction with compositions which become hardened by reaction below 320 degrees F. When the reaction temperature is lower than this and the object formed is liable to become discolored or injured by this temperature, an alloy of lower melting point may be used.

As is obvious, various pigments and filling bodies may be added to the composition.

By my invention irregular cavities and depressions of all sorts can be molded in objects, which results would often be impossible by the methods of molding known to the art.

Having now described my invention, what I claim and desire to protect by Letters Patent is as follows:—

1. The method of forming hollow objects of infusible phenolic condensation products which consists in the use of a core of a material having a melting point higher than the reaction temperature of the ingredients of the condensation product, shaping the object to be formed around the said core, of substances which upon application of sufficient heat, react to harden and form an infusible phenolic condensation product, heating the object sufficiently to cause the desired reaction, raising the temperature sufficiently to melt the core, and removing the melted core through a suitable opening or openings, substantially as described.

2. The method of forming hollow objects of phenolic condensation products, which consists in the use of a core of a material having a melting point higher than the reaction temperature of the ingredients of the condensation product, and lower than the temperature at which the product would be deformed or injured, forming the object in a suitable mold around the said core, of substances which upon application of sufficient heat, react to harden and form an infusible phenolic condensation product, heating the object sufficiently to cause the desired reaction, raising the temperature sufficiently to melt the core, and removing the melted core through a suitable opening or openings, substantially as described.

3. The method of forming hollow objects of phenolic condensation products, which consists in the use of a core of a material having a melting point higher than the reaction temperature of the ingredients of the condensation product, and lower than the temperature at which the product would be deformed or injured, placing the core within a suitable mold, pouring within the mold around the core a liquid substance which upon application of sufficient heat reacts to harden and form an infusible phenolic condensation product, heating the object sufficiently to cause the desired reaction, raising the temperature sufficiently to melt the core, and removing the melted core through a suitable opening or openings, substantially as described.

4. The method of forming hollow objects of phenolic condensation products, which consists in the use of a core of a material having a melting point higher than the reaction temperature of the ingredients of the condensation product, shaping the object to be formed around the said core, of a plastic mass comprising a fusible phenol resin and a methylene-containing hardening agent, heating the mass sufficiently to cause a hardening reaction to take place between the ingredients thereof, raising the temperature sufficiently to melt the core and removing the melted core through a suitable opening or openings, substantially as described.

This specification signed and witnessed this 3d day of March 1911.

JONAS WALTER AYLSWORTH.

Witnesses:
 DYER SMITH,
 ANNA R. KLEHUN.